(12) United States Patent
Nelson et al.

(10) Patent No.: US 11,999,192 B1
(45) Date of Patent: Jun. 4, 2024

(54) BICYCLE DRIVE ASSEMBLY

(71) Applicant: ENVE Composites, LLC, Ogden, UT (US)

(72) Inventors: Kevin E. Nelson, Salt Lake City, UT (US); Jerome Fantin, Montagny les Lanches (FR)

(73) Assignee: ENVE Composites, LLC, Ogden, UT (US)

( * ) Notice: Subject to any disclaimer, the term of this patent is extended or adjusted under 35 U.S.C. 154(b) by 0 days.

(21) Appl. No.: 18/072,798

(22) Filed: Dec. 1, 2022

(51) Int. Cl.
*F16D 41/36* (2006.01)
*B60B 27/04* (2006.01)

(52) U.S. Cl.
CPC ............ *B60B 27/047* (2013.01); *F16D 41/36* (2013.01); *F16D 2300/22* (2013.01)

(58) Field of Classification Search
CPC ...... F16D 41/125; F16D 41/185; F16D 41/22; F16D 41/36; F16D 43/2022–2024; F16D 11/04; F16D 11/10; F16D 11/14; B60B 27/02–047
USPC .......................................................... 192/64
See application file for complete search history.

(56) References Cited

U.S. PATENT DOCUMENTS

| | | | |
|---|---|---|---|
| 5,738,197 | A | 4/1998 | Kroger et al. |
| 7,252,344 | B2 | 8/2007 | Mercat et al. |
| 8,414,434 | B2 | 4/2013 | Mercat et al. |
| 8,677,837 | B2 | 3/2014 | Mercat et al. |
| 9,599,526 | B2 | 3/2017 | Mercat et al. |
| 9,610,802 | B2 | 4/2017 | Satterthwaite et al. |
| 10,350,835 | B2 | 7/2019 | Satterthwaite et al. |
| 2004/0251736 | A1 | 12/2004 | Mercat et al. |
| 2008/0264748 | A1* | 10/2008 | Chen ................... B60B 27/0073 192/64 |
| 2010/0167854 | A1 | 7/2010 | Mercat et al. |
| 2014/0202262 | A1 | 7/2014 | Mercat et al. |
| 2018/0029412 | A1* | 2/2018 | Walthert ............... F16C 35/077 |
| 2023/0119459 | A1 | 4/2023 | Mercat et al. |
| 2023/0182857 | A1 | 6/2023 | Mercat |
| 2023/0192231 | A1 | 6/2023 | Mercat |

FOREIGN PATENT DOCUMENTS

| | | |
|---|---|---|
| DE | 202021100075 U1 | 3/2021 |
| EP | 998399 B1 | 11/2002 |
| EP | 2221192 A1 | 8/2010 |
| EP | 1894645 B1 | 7/2013 |

(Continued)

*Primary Examiner* — Stacey A Fluhart
(74) *Attorney, Agent, or Firm* — Terence P. O'Brien; Todd A. Rathe (57) ABSTRACT

A bicycle drive assembly may include an axle, a hub shell rotatably mounted on the axle by a first bearing, a free hub rotatably mounted on the axle by a second bearing, and a ratchet mechanism releasably coupling the free hub to the hub shell to transmit torque from the free hub to the hub. The ratchet mechanism may include a first ratchet ring having an inner surface joined to the hub shell for rotation with the hub shell and a second ratchet ring having an inner surface joined to the free hub for rotation with the free hub. The first ratchet ring and the second ratchet ring encircle and radially overlap the first bearing and the second bearing, respectively. At least one spring resiliently biases the first ratchet face and the second ratchet face into engagement to transmit torque from the free hub to the hub shell.

14 Claims, 8 Drawing Sheets

(56) References Cited

FOREIGN PATENT DOCUMENTS

| | | | |
|---|---|---|---|
| EP | 2757358 | | 7/2014 |
| EP | 3112183 | B1 | 3/2018 |
| EP | 3572238 | A1 | 11/2019 |
| FR | 3039458 | | 2/2017 |
| TW | 1724910 | B * | 4/2021 |

* cited by examiner

BICYCLE DRIVE ASSEMBLY

BACKGROUND

Bicycles are frequently used for transportation and recreation. Such bicycles typically include a drive assembly having a hub shell rotatably supported about an axle and joined to the rim of a wheel. The drive assembly may further include a free hub that transmits torque to the hub shell and the wheel to rotatably drive the wheel about the axle. The free hub may transmit the torque to the hub shell using a ratchet mechanism that permits the hub shell and the wheel to freely rotate when torque is no longer being applied to the free hub.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example bicycle drive assemblies that may offer greater durability and lower weight, easier maintenance, lower manufacturing complexity and cost, and higher degrees of engagement between the free hub and the hub shell. The example bicycle drive assemblies comprise a ratchet mechanism that may comprise ratchet rings which are joined to the hub shell and the free hub. Because the ratchet rings are formed separately from the hub shell and the free hub, the ratchet rings may be formed from harder, more durable materials while the hub shell and/or the free hub are formed from lighter weight materials.

The ratchet rings of the example bicycle drive assemblies may overlap and encircle the bearings that rotatably support the hub shell and the free hub about the axle. Because the ratchet rings overlap the bearings, the bearings of the hub shell and the free hub may be more closely positioned to one another along the axle. As a result, deflection of the axle may be reduced. This deflection reduction may result in more reliable engagement and less wheel flex. This deflection reduction may also result in less wear of the axle and bearings, increasing durability and prolonging life of the drive assembly.

The example bicycle drive assemblies may comprise a spring, such as a wave washer, captured between bearings that rotatably support the free hub and the hub shell about the axle. The spring may reduce wear of such bearings over time and increase the durability of the drive assembly.

The example bicycle drive assemblies may comprise a damper captured between one of the ratchet rings and the free hub. The damper absorbs vibration and reduces noise. The dampener may further increase the durability of the drive assembly.

The example bicycle drive assemblies may comprise a retainer that retains the ratchet rings together, in engagement with one another, upon separation and withdrawal of the free hub from the hub shell. As a result, the ratchet mechanism is less likely to experience contamination during maintenance of the drive assembly.

The example bicycle drive assemblies may comprise similar or substantially identical ratchet rings. High performance of the ratchet mechanism may be dependent upon the precision of the ratchet mechanism and, namely, the manufacturing precision of the ratchet faces of the ratchet rings. Because the ratchet mechanism utilizes similar or substantially identical ratchet rings, manufacturing complexity and cost may be reduced.

The ratchet rings of the example bicycle drive assemblies may have inner surfaces, rather than outer surfaces, joined to the hub shell and the free hub. In some implementations, the inner surfaces include splines which are interlocked to corresponding splines formed in the hub shell and the free hub. Because the example ratchet rings have inner diameters or inner surfaces directly connected to the hub shell and the free hub, the height and surface area of the ratchet face of each of the ratchet rings may be enlarged, providing a greater number of teeth and achieving higher degrees of engagement (a larger number of engagement points) between the ratchet rings and between the free hub and the hub shell. The higher degree of engagement may offer reduced movement at the pedal to engage the drive, especially on rough or uneven terrains, such as when such drive assemblies are employed in mountain bikes.

The ratchet rings of the example bicycle drive assemblies may each have an axial surface, a ratchet face, and a radial surface, the inner surface of the ratchet ring being joined to the hub shell or joined to the free hub. In some implementations, the inner surface of each of the ratchet rings is splined for being interlocked with corresponding splines of the hub shell or with corresponding splines of the free hub. The axial face, the ratchet face, may have a radial length RL. The radial surface, the inner surface, in some implementations, may have an axial length of at least 75% of the length of the axial face, at least 0.75 RL. In those implementations where the radial surface include splines, the axial length of the splines may be greater than the radial length of the ratchet faces. The relatively long axial length of the inner surface of each of the ratchet rings may reduce deflection of the of the ratchet rings to enhance performance and durability of the drive assembly.

In some implementations, the cross section of the ratchet rings may have an L-shape, providing a larger ratchet face with a larger number of teeth for enhanced engagement and also providing a longer inner surface for joining to the hub shell and the free hub. In some implementations, each of the L-shaped ratchet rings has a first leg of at least 3 mm and a second leg extending perpendicular to the first leg, the second leg having a length of at least 3 mm. In some implementations, the ratchet mechanism comprises a first ratchet ring having a first leg providing a ratchet toothed surface forming a first ratchet face and a second leg having a splined surface, wherein the second leg extends from the first leg in a direction towards the hub shell, the splined surface interlocking with the hub shell. In some implementations, the ratchet mechanism comprises a second ratchet ring having a first leg providing a ratchet toothed surface forming a second ratchet face and a second leg having a splined surface, wherein the second leg of the second ratchet ring extends from the first leg in a direction towards the free hub, the splined surface interlocking with the free hub. The second legs of the first ratchet ring and the second ratchet ring extend away from one another in opposite directions.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the phrase "configured to" denotes an actual state of configuration that fundamentally ties the stated function/use to the physical characteristics of the feature proceeding the phrase "configured to".

For purposes of this disclosure, the term "releasably" or "removably" with respect to an attachment or coupling of two structures means that the two structures may be repeatedly connected and disconnected to and from one another without material damage to either of the two structures or their functioning.

Figure 1:
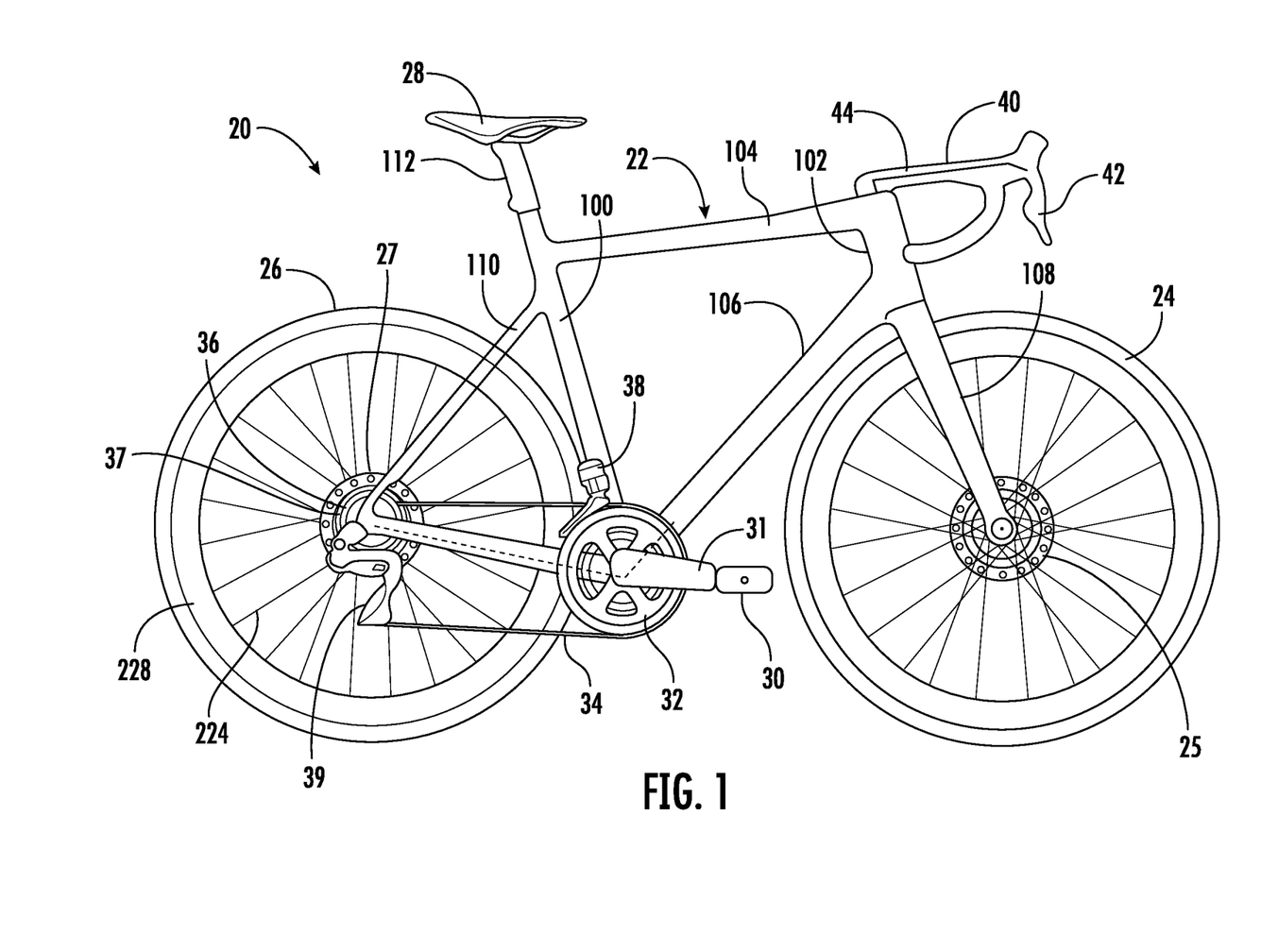
FIG. 1 is a side view of an example bicycle including an example rear-wheel drive assembly.

FIG. 1 is a side view illustrating an example bicycle 20. FIG. 1 illustrates an example of a bicycle that includes a drive assembly for its rear-wheel that may offer greater durability and lower weight, easier maintenance, lower manufacturing complexity and cost, and higher degrees of engagement between the free hub and the hub shell. Bicycle 20 comprises frame 22, front wheel 24, front disc brake system 25, rear-wheel 26, rear disc brake system 27, seat 28, pedals 30 supported by crank arms 31, front cog wheels 32, gear chain 34, rear drive assembly 36 including cog wheels 37, front derailer 38, rear derailer 39, handlebars 40, and braking-shifting levers 42.

Frame 22 supports the remaining components of bicycle 20. Frame 22 comprises seat tube 100, head tube 102, top or cross tube 104, down tube 106, rake 108 and rear struts 110. Seat tube 100 supports a seat post 112 which support seat 128. Head tube 102 supports handlebars 40 and rake 108. Cross tube 104 and down tube 106 extend between seat tube 100 and head tube 102. Rake 108 is rotatably coupled to head tube 102 and supports front wheel 24. Rear struts 110 extend rearwardly from seat tube 100 and support rear-wheel 26 and drive assembly 36. Some of the various components forming frame 22 may be integrally formed as a single unitary body or may be welded or otherwise joined to one another. Each of such tubes or structures forming frame 22 may have cylindrical or non-cylindrical shapes. Each such tubes or structures may be hollow to reduce weight.

Front wheel 24 is rotatably supported by rake 108. Front disc brake system 25 is supported by rake 108 and is actuatable by cabling (not shown) to retard the rotation of or brake front wheel 24. Rear-wheel 26 is rotatably supported by drive assembly 36 which is supported by struts 110. Rear disc brake system 27 is supported by rear struts 110 and is actuatable by cabling (not shown) to retard the rotation of or brake rear-wheel 26. In other implementations, other braking system may be employed which are actuated. For example, in other implementations, bicycle 20 may utilize front and rear brakes which include brake pads or bars that are selectively controlled to squeeze against a braking surface of the wheel 24, 26 to brake their respective rotation.

Figure 2:
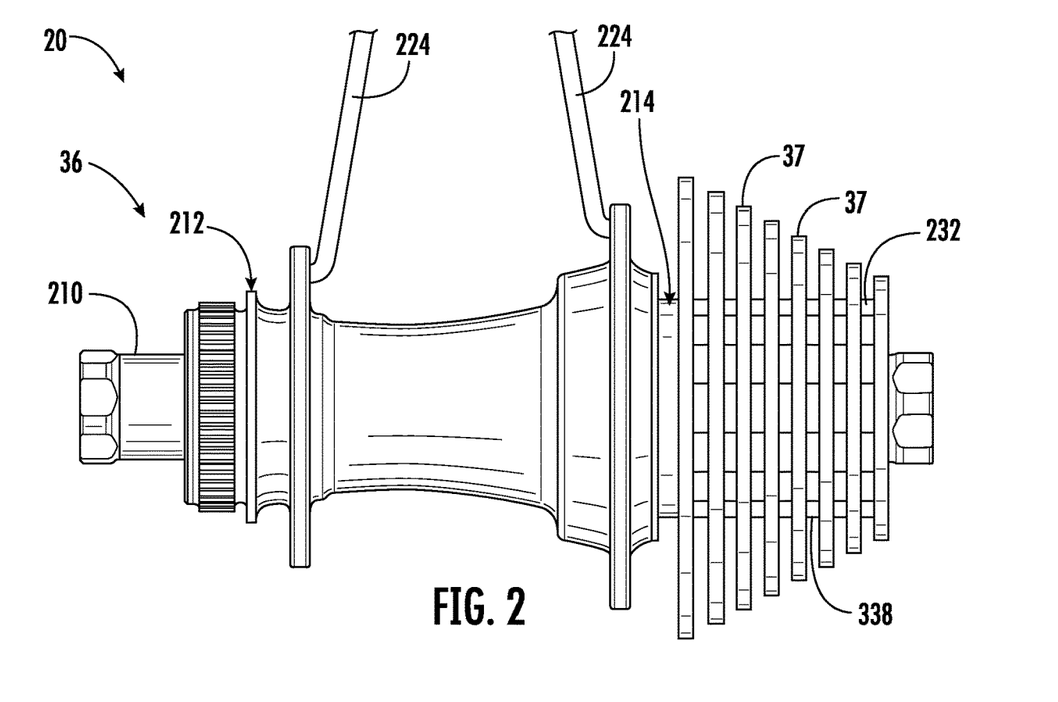
FIG. 2 is an enlarged side view of the rear-wheel drive assembly of the bicycle of FIG. 1.
Figure 3:
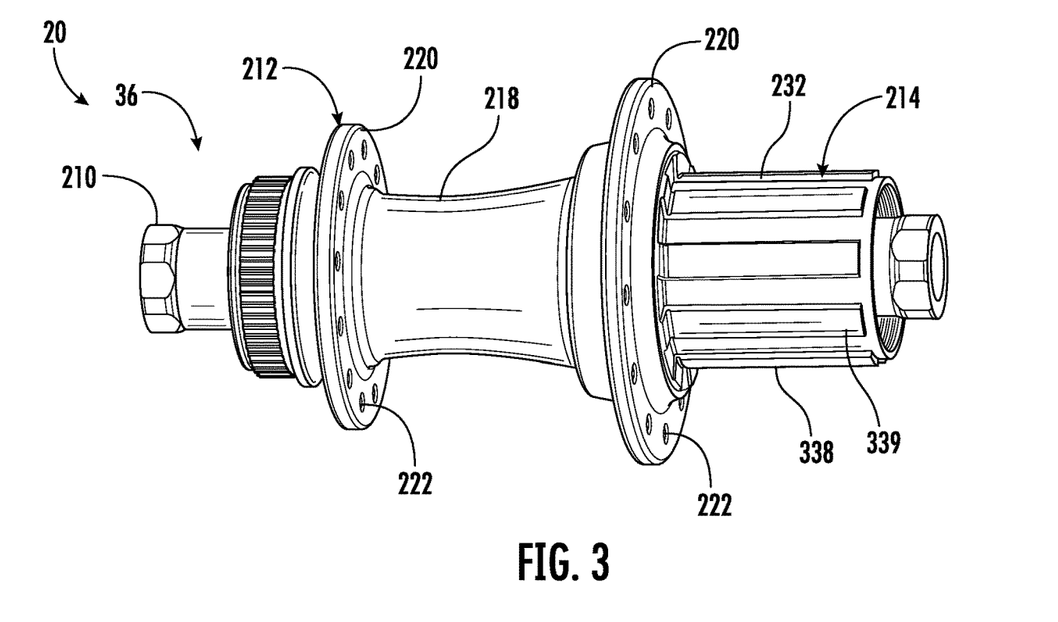
FIG. 3 is a perspective view of the example rear-wheel drive assembly of FIG. 2 without cog wheels.

Seat 28 is supported by seat post 112. Pedals 30 are connected to cog wheels 32 by crank arm 31. Front cog wheels 32 comprise a set of differently sized cogs, in the form of gears or sprockets, which are rotatably supported by frame 22. Front cog wheels 32 are configured to be rotated by the rotation of pedals 30, by rider, about the axis of cog wheels 32. Gear chain 34 is selectively connected one of the cog wheels 32 and is selectively connected to one of rear cog wheels 37. Rear cog wheels 37 are connected a free hub which is connected to a hub shell (both of which are shown in FIGS. 2 and 3) such that rotation of the rear cog wheels 37 rotates rear-wheel 26. The particular cog wheels connected by gear chain 34 determines the speed or gear ratio of bicycle 20. Gear chain 32 transmits motion and torque from the selected one of front cog wheels 32 to the selected one of rear cog wheels 37 to propel rear-wheel 26.

Front derailer 38 selectively connects gear chain 34 to a selected one of the different cog wheels or sprockets of front cog wheels 32. Front derailer 38 shifts gear chain 34 from one cog wheel or sprocket to another cog wheel or sprocket of front cog wheel 32. Front derailer 38 may be actuated by the rider.

Rear derailer 39 selectively connects gear chain 34 to a selected one of the different cog wheels or sprockets of rear cog wheels 37. Rear derailer 39 shifts gear chain 34 from one cog wheel or sprocket to another cog wheel or sprocket of rear cog wheels 37. Rear derailer 39 may be actuated by a rider Handlebars 40 are supported by front tube 102 of frame 22. Brake-shift levers 42 are movably supported by handlebars 40 and are operably coupled to cabling 44. Brake and shift levers 42 may be located on each of the right and left sides of handlebars 40. Brake and shift levers 42 are manually actuatable to individually actuate brake systems 25, 27 and individually actuate or move derailers 38, 39 depending upon which of the particular ones of levers 42 are moved.

FIG. 2 is a side view illustrating portions of the example drive assembly 36 incorporated as part of bicycle 20. FIG. 3 is a perspective view illustrating portions of the drive assembly 36 of FIG. 2 without the rear cog wheels 37. As shown by FIG. 2, drive assembly 36 comprises axle 210, hub 212, free hub 214 and cog wheels 37. Axle 210 comprise a shaft about which hub 212 and free hub 214 rotate. Hub 200 comprises a hub shell 218 and spoke or hub flanges 220. As shown by FIG. 3, each of spoke flanges 220 comprises spoke holes 222 which are circumferentially spaced about the rotational axis of hub shell 218. As shown by FIG. 2, spoke holes 222 receive end portions of spokes 224 (two which are shown) which have opposite ends connected to rim 228 of wheel 26 (shown in FIG. 1).

Free hub 214 comprises a free hub shell 232 which rotates about axle 210 and which engages portions of hub shell 218 via a ratchet mechanism (described hereafter) to transmit torque to the hub shell 218 to rotatably drive wheel 26. Free hub shell 232 is connected to cog wheels 37. In some implementations, cog wheels 37 may be provided as part of a cassette which is interlocked (via splines) to the free hub shell 232. In other implementations, cog wheels 37 may be connected to the three of shell 232 in other fashions. In yet other implementations, torque may be transmitted to the free hub shell 232 using other mechanisms.

Figure 4:
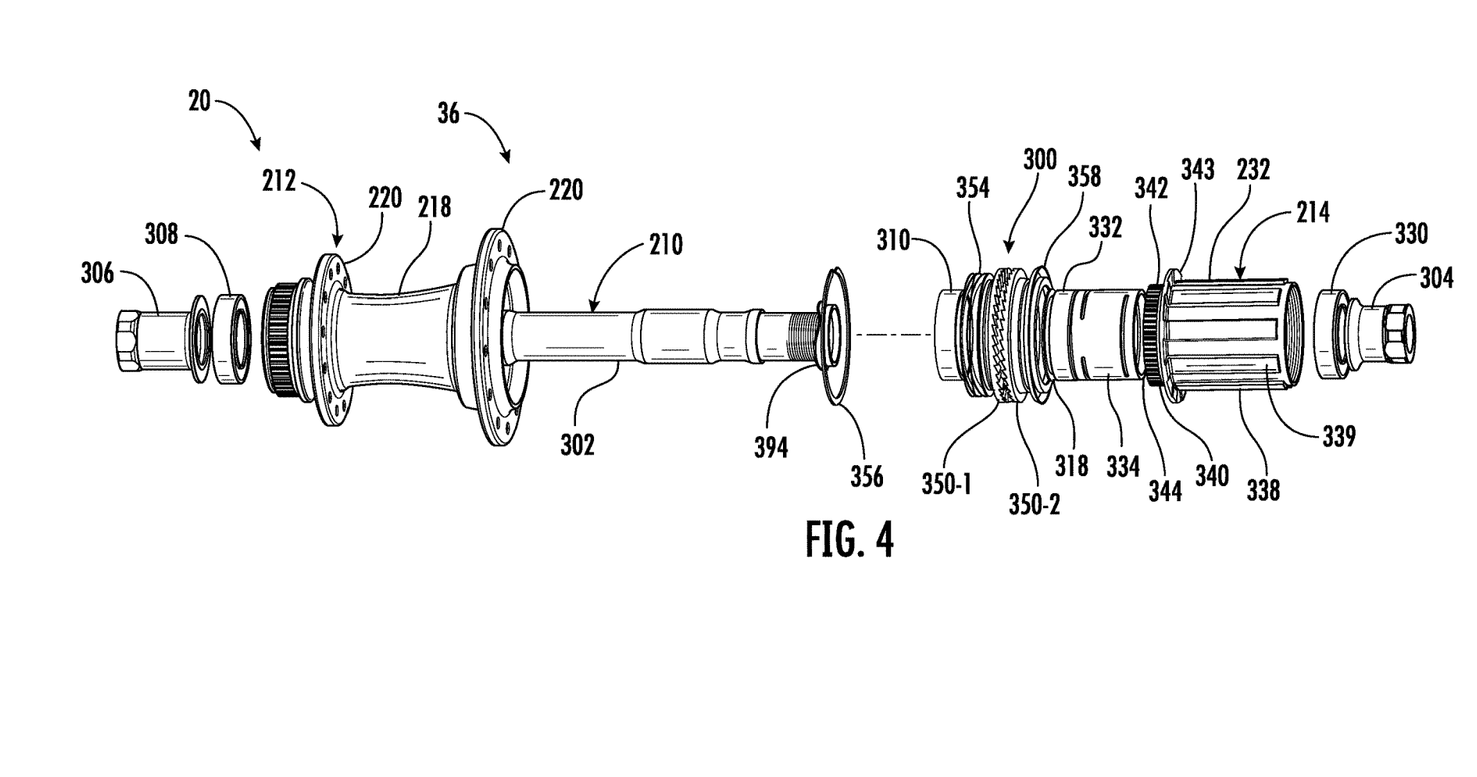
FIG. 4 is an exploded perspective view of the example rear-wheel drive assembly of FIG. 3.
Figure 5:
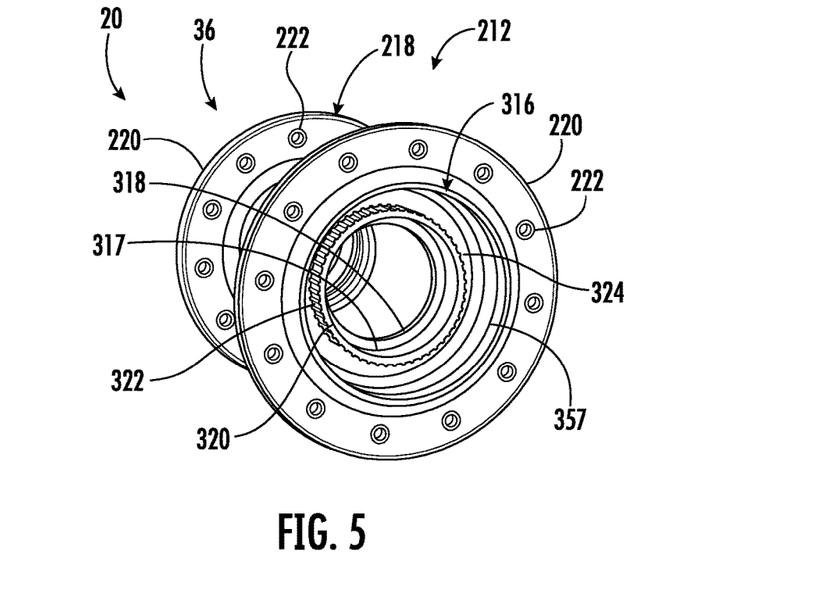
FIG. 5 is a perspective view of an example hub shell of the rear-wheel drive assembly of FIG. 4.
Figure 6:
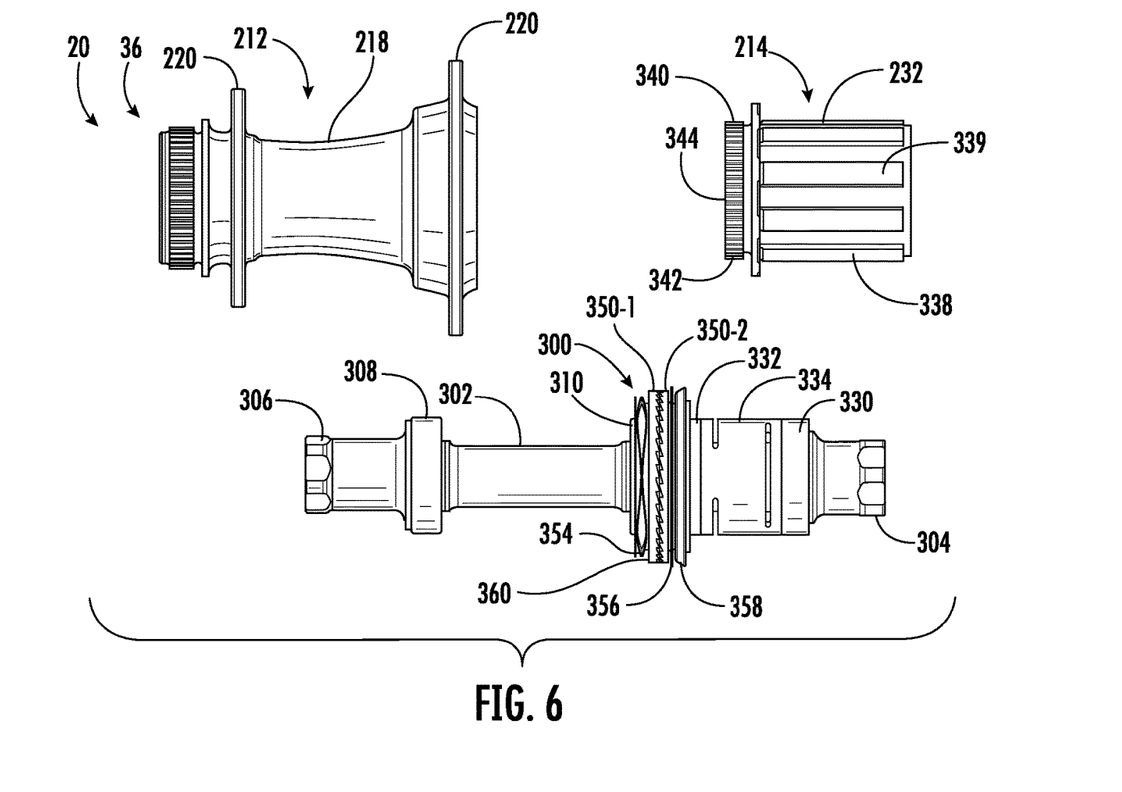
FIG. 6 is a side view illustrating the example rear-wheel drive assembly of FIG. 3 with the example hub shell and an example free hub shell being separated.
Figure 7:
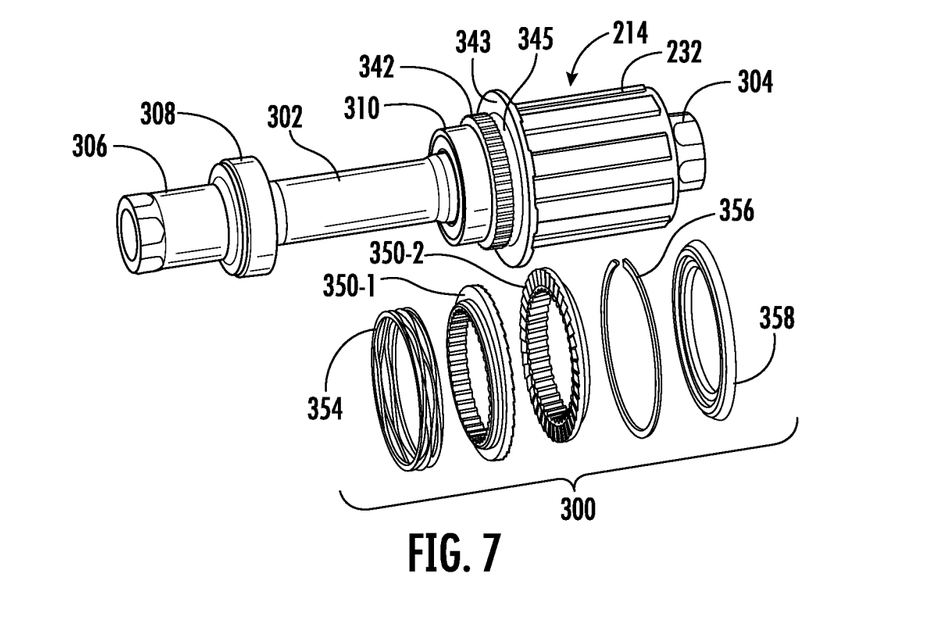
FIG. 7 is a perspective view of the example hub shell of FIG. 3 with the example hub shell being and with an example ratchet mechanism being separated and exploded.

FIGS. 4-14 illustrate portions of drive assembly 36 in more detail. FIG. 4 is an exploded perspective view of the axle 210, hub 212 and free hub 214 of drive assembly 36. FIG. 5 is an enlarged perspective view of the example hub shell 218, illustrating interior portions of hub shell 218 which connect to the ratchet mechanism that connects hub shell 218 to the free hub shell 232. FIGS. 6 and 7 are partially exploded perspective views of the example drive assembly 36 of FIG. 4.

As shown by FIG. 4, axle 210 supports hub 212, free hub 214 and ratchet mechanism 300. Axle 210 comprises axle shaft 302, end cap 304 and endcap 306. End caps 304, 306 are mounted to opposite ends of axle shaft 302 and assist in retaining the remaining components of drive assembly 36 (excluding cog wheel 37) upon axle shaft 302. End caps 304, 306 further assist in mounting axle shaft 302 to rear struts 110 of bicycle frame 22. In other implementations, axle 210 may have other configurations.

Hub 212 comprises hub shell 218 with spokes flanges 220, hub bearing 308 and hub bearing 310. Hub shell 218 comprises a generally hollow cylindrical structure formed from a metal, such as aluminum. Hub shell 218 connects to spokes 224 and supports rim 228 of wheel 26. As shown by FIG. 5, hub shell 218 comprises an axial through opening 316 through which axle shaft 302 extends. Hub shell 218 comprises an internal groove 317 that receives a snap ring 318 which is sized and located to axially retain bearing 332 about and along axle shaft 302. In other implementations, ring 318 may be replaced with a shoulder integrally formed as part of hub shell 218.

As further shown by FIG. 5, hub shell 218 comprises an internal ring 320 which encircles through opening 316 and which includes an external peripheral surface 322 configured to permit a ratchet ring of ratchet mechanism 300 to be axially slid onto and about the internal ring 320 and to be interlocked with the ring 320 inhibit the ratchet frame from rotating relative to hub shell 218 about the axis of axle shaft 302. In the example illustrated, peripheral surface 322 comprises external or outwardly projecting splines 324 (a series of projections and grooves) that are configured to interlock with a corresponding set of internal injecting splines of the ratchet ring (to be described hereafter).

In the example illustrated, hub shell 218 further comprises an internal groove 357 which encircles the through opening 316. The internal groove 357 is configured to receive retainer, such as a C-shaped snap ring. As will be described hereafter, the internal groove 357 is located and sized such that the received retainer projects into the through opening 316 to abut an axial face of a second ratchet ring of the ratchet mechanism to retain both ratchet rings in engagement with one another, as a unit, during and after separation of freehub 214 from hub 212.

Bearings 308 and 310 extend about axle shaft 302 and rotatably support hub shell 218 for rotation about the axis of axle shaft 302. In the example illustrated, bearings 308, 310 each comprise a rolling bearing having an inner race, an outer race and rollers or balls therebetween. For example, in some implementations, bearings 308, 310 may comprise roller bearings. In other implementations, bearings 308, 310 may comprise other forms of bearings for rotatably supporting hub shell 218 about axle shaft 302.

Free hub 214 is configured to receive torque from cog wheels 37 and to selectively transmit the torque to hub 212 and wheel 26 via ratchet mechanism 300. Free hub 214 comprises free hub shell 232, bearing 330, bearing 332 and bearing spacer 334. Free hub shell 232 comprises a generally hollow cylindrical structure formed from a metal, such as aluminum. Free hub shell 232 has an axial opening such that shell 232 may extend about and along axle shaft 302. Free hub shell 232 comprises an outer external interlocking surface 338 configured to interlock with cog wheels 37. In the example illustrated, interlocking surface 338 include splines 339 which interlock with a cassette providing cog wheels 37. In other implementations, surface 338 may have other configurations to interlock or key with a cassette or individual cog wheels 37. In still other implementations, cog wheels 37 may be affixed or otherwise joined to shell 232 in other fashions.

Similar to hub shell 218, free hub shell 232 comprises a ring 340 having an external surface 342 configured to permit a ratchet ring of ratchet mechanism 300 to be axially slid onto and about the internal ring 320 and to be interlocked with the ring 340 to inhibit the ratchet ring from rotating relative to free hub shell 232 about the axis of axle shaft 302. External surface 342 axially projects towards hub shell 218 from a collar 343 formed as part of free hub shell 232. In the example illustrated, peripheral surface 342 comprises external or outwardly projecting splines 344 (a series of projections and grooves) that are configured to interlock with a corresponding set of inwardly projecting splines of the ratchet ring (to be described hereafter).

Bearings 330 and 332 extend about axle shaft 302 and rotatably support free hub shell 232 for rotation about the axis of axle shaft 302. In the example illustrated, bearings 330 and 332 each comprise a rolling bearing having an inner race, an outer race and rollers or balls therebetween. For example, in some implementations, bearings 330,332 may comprise roller bearings. In other implementations, bearings 330,332 may comprise other forms of bearings for rotatably supporting free hub shell 232 about axle shaft 302.

Bearing spacer 334 axially spaces bearings 330 and 332 from one another. In the example illustrated, bearing spacer 334 comprises an elongate sleeve positioned about axle shaft 302 and having axially facing edges that abut the outer race of bearings 330 and 332. Bearing spacer 334 has an outer surface configured to facilitate the axial sliding positioning of free hub sleeve 232 over and about spacer 334. In other implementations, spacer 334 may have other configurations or may be omitted, such as where other mechanisms or structures are incorporated into axle shaft 302 or other components are utilized for spacing bearings 330 and 332.

Ratchet mechanism 300 transmits torque from free hub 214 (sometimes referred to as a driver) to hub shell 218 (sometimes referred to as a hub sleeve). Ratchet mechanism 300 serves as a free wheel device or clutch adapter for connecting free hub 214 and hub shell 218 in a torque transmitting state when torque is being supplied to free wheel hub 232 in a first rotational direction. Ratchet mechanism 300 permits hub shell 218 and wheel 26 to freely rotate relative to free wheel hub 212 when torque is no longer being applied to free wheel hub 212 or when torque is being supplied to free wheel hub 214 in a direction opposite to that of the direction in which torque is transmitted. As shown by FIGS. 4, 6 and 7, ratchet mechanism 300 comprises ratchet rings 350-1, 350-2 (collectively referred to as ratchet rings 350), spring 354, retainer 356, and dampener 358.

Ratchet rings 350 comprise components that are distinct and separate from hub shell 218 and free hub shell 232. As a result, ratchet rings 350 may be formed from materials that are different from hub shell 218 and free hub shell 232. In the example illustrated, ratchet rings are each formed from material harder than the material or materials forming hub shell 218 and free hub shell 232. In the example illustrated, hub shell 218 and free hub shell 232 are each formed from a lighter weight metal material, such as aluminum, whereas ratchet rings 350 are formed from a harder, albeit heavier, metal material such as steel or titanium. In other implementations, hub shell 218, free hub shell 232 and ratchet rings 350 may be formed from other materials. For example, hub shell 218 and/or free hub shell 232 may be formed from other metals or non-metal materials, such as a fiber reinforced material. Because the shells 218, 232 may be formed from lighter weight materials while the ratchet rings 350 are formed from harder materials, rear drive assembly 36 may have enhanced durability with a reduced overall weight.

Figure 8:
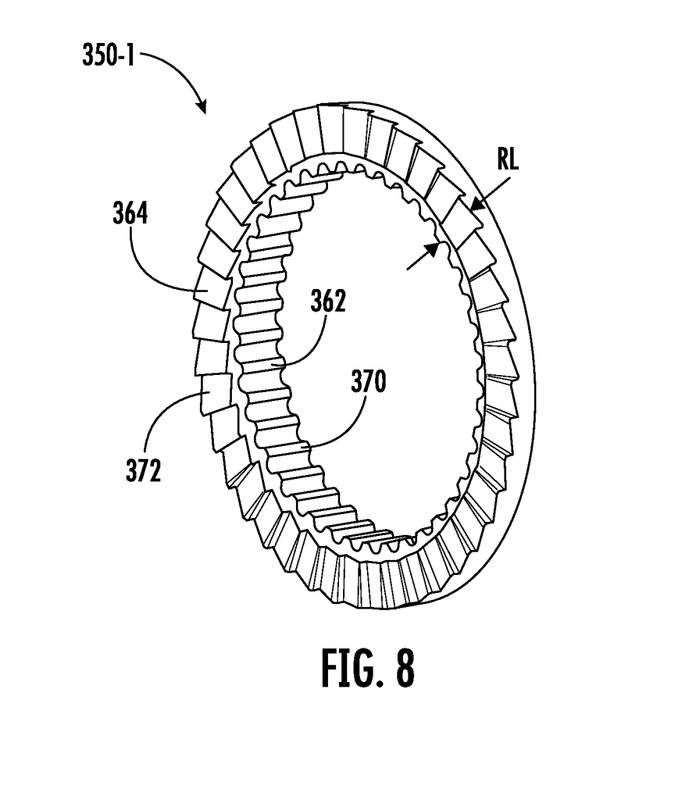
FIG. 8 is a front perspective view of an example ratchet ring of the example rear-wheel drive assembly of FIG. 3.
Figure 9:
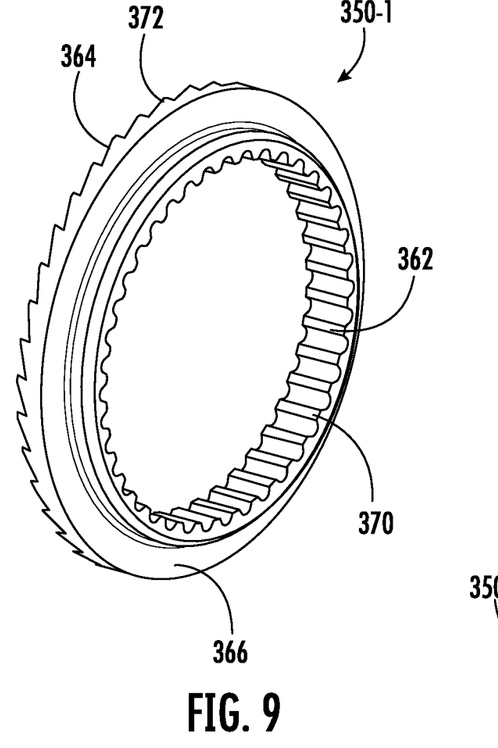
FIG. 9 is a rear perspective view of the example ratchet ring of FIG. 8.
Figure 10:
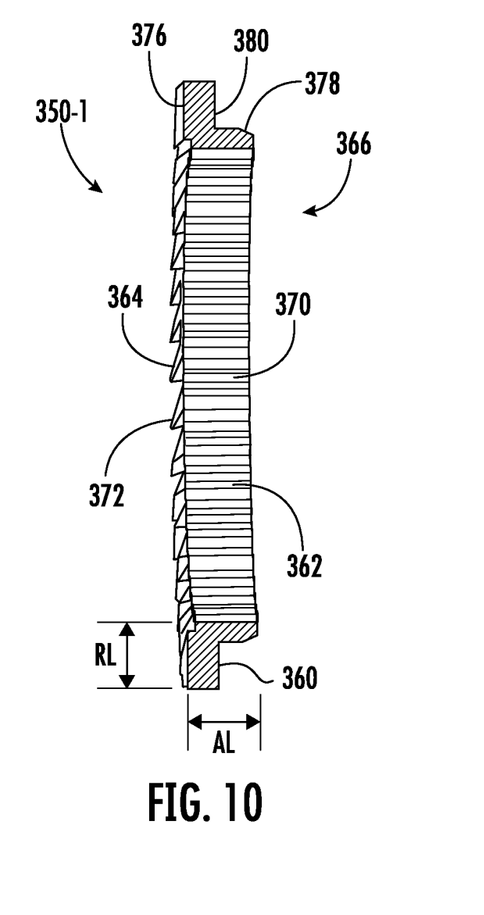
FIG. 10 is a sectional example ratchet ring of FIG. 8.

FIGS. 8-10 illustrate ratchet ring 350-1 in more detail. As shown by FIGS. 8-10, ratchet ring 350-1 comprises an inner diameter or otherwise inner surface 362, a ratchet face 364, and a backside 366 (shown in FIGS. 9 and 10). Inner surface 362 is configured to interlock with the exterior surface 322 of ring 320 of hub shell 218. In the example illustrated, inner surface 362 is configured to facilitate axial sliding or positioning of ratchet ring 350-1 onto and about ring 320, wherein relative rotation of ratchet ring 350-1 and hub shell 218 about the axis of axle shaft 302 is inhibited by such interlocking. In the example illustrated, inner surface 362 comprise a series of splines 370 which mesh with corresponding splines 324 on exterior surface 322 of ring 320 of hub shell 218. In other implementations, other interlocking features may be provided on inner surface 362 (and outer surface 322) to facilitate such interlocking. For example, surfaces 322 and 362 may have polygonal cross-sectional shape that facilitates interlocking or keying of ring 350-1 onto ring 320 of hub shell 218.

Ratchet face 364 comprise the face of ratchet ring 350-1 which is to engage the corresponding ratchet face 364 of ring 350-2 to facilitate transmission of torque from ring 350-2 to ring 350-1. Ratchet face 364 comprise a series of ramped teeth 372 that are configured to bite into the corresponding teeth 372 of the ratchet face 364 of ring 350-2 when ring 350-2 is being rotatably driven in a torque transmitting direction by free hub 214. Ramped teeth 372 slide over or ratchet relative to the teeth 372 of ratchet ring 350-2 when ring 350-2 is not being rotatably driven and when ring 350-1 and wheel 26 are rotating in a non-torque transmitting direction (opposite to the torque transmitting direction), such as during coasting of the bicycle.

Because the inner surface 362 of ring 350-1 is joined to the exterior surface 322 of ring 320 of axle hub 218, the radial length RL of ratchet face 364 is not limited or constricted by the diameter of inner surface 362. Moreover, the outer diameter of ratchet face 364 is not limited or constricted by the diameter of inner surface 362. As result, the radial length RL of ratchet face 364 and the outer and inner diameter ratchet face 364 may be larger. The larger radial length RL of ratchet face 364 provides a greater surface area for engagement with the ratchet face of ring 350-2. The larger inner and outer diameter of ratchet face 364 facilitate the provision of a greater number of individual ratchet teeth 372. Because the example ratchet rings have inner diameters or inner surfaces directly connected to the hub shell and the free hub, the height and surface area of the ratchet face of each of the ratchet rings 350 may be enlarged, providing a greater number of teeth 372 and achieving higher degrees of engagement (a larger number of engagement points) between the ratchet rings 350 and between the free hub 214 and the hub 212. The higher degree of engagement may offer reduced movement of the pedal to engage the drive assembly, especially on rough or uneven terrains, such as when such drive assemblies are employed in mountain bikes.

In some implementations ratchet face 364 may have a radial length RL of at least 3 mm. In some implementations, ratchet face 364 may have at least 40 teeth having a pitch diameter of at least 24 mm and with each tooth having a height at least 0.30 mm. In some implementations, ratchet face 364 may have at least 60 teeth having a pitch diameter of at least 24 mm and with each tooth having a height at least 0.25 mm. In some implementations, ratchet face 364 may have at least 80 teeth having a pitch diameter of at least 24 mm and with each tooth having a height at least 0.20 mm. In some implementations, ratchet face 364 may have at least 100 teeth having a pitch diameter of at least 24 mm and with each tooth having a height at least 0.15 mm. In some implementations, the pitch and tube height ratchet face having 40, 60, 80, or 100 teeth may vary. As previously noted, the director joining of the inner surface 362 of ratchet ring 350-1 facilitates a provision of the larger number of teeth in the greater engagement points for ratchet face 364.

As shown may FIG. 10, ring 350-1 is configured such that the inner surface 362 has a longer axial length AL. The axial face, the ratchet face 364, may have a radial length RL, wherein the inner surface may have an axial length AL of at least 75% of the length of the axial face, at least 0.75 RL. In those implementations where the inner surface include splines, the axial length of the splines may be at least 75% of the length of the axial face, at least 0.75 RL in some implementations, the axial length of the inner surface 362 or the axial length of the splines 370 may be greater than or equal to the radial length RL of the ratchet face 364. The relatively long axial length of the inner surface 362 of ratchet ring 350-1 may reduce deflection of the ratchet ring 350-1 to enhance performance and durability of the drive assembly.

As shown by FIGS. 9 and 10, backside 366 is shaped such that ratchet ring 350-1 has an L-shaped cross-section, wherein the L-shaped includes a first leg 376 supporting the ratchet face 364 and a second leg 378 forming the inner surface 362 with the splines 370. Legs 376 and 378 may each have a length of at least 3 mm. In the example illustrated, the surface of legs 376 and 378, forming the backside 366, form a shoulder 380 against which spring 354 may be retained, wherein the spring may extend around leg 378 and may abut against the rear face of leg 376. As discussed above, the length or radial length of leg 376 increases the area number of teeth of ratchet face 364. The axial length of leg 378 increases the axial length of inner surface 362 and the axial length of splines 370 to increase the number of engagement points on ratchet face 364 and to reduce deflection of ratchet ring 350-1. The L-shape of ring 350-1 facilitates a provision of the larger ratchet face 364 and the longer inner surface 362 and splines 370 while reducing the overall weight of ring in other implementations, rather than having an L-shape, ring 350-1 may have a cross-sectional shape that is rectangular, square, rounded, V-shaped, or the like.

In the example illustrated, ratchet ring 350-2 is substantially similar to or identical to ratchet ring 350-1, but wherein ratchet ring 350-2 mirrors ratchet ring 350-1 as part of drive assembly 36. In other words, ratchet face 364 of ratchet rings 350 face one another, whereas legs 378 of ratchet rings 350 extend in opposite directions away from one another. Leg 378 of ratchet ring 350-1 extends from ratchet face 364 towards hub sleeve 218. Leg 378 of ratchet ring 350-2 extends away from ratchet face 364 towards free wheel hub sleeve 232. The splines 370 of ratchet ring 350-2 interlock with the splines 344 of ring 340 of free hub shell 232, inhibiting relative rotation of ratchet ring 350-2 and free hub shell 232. During the transmission of torque, ramped teeth 372 of ratchet ring 350-2 bite into and against the teeth 372 of ratchet ring 350-1 such that rings 350 rotate in unison with one another. During coasting or periods when torque is not being transmitted, teeth 372 of ratchet rings 350 slide over top of one another, at least one of the rings 350 rotating relative to the other of the rings 350.

High performance of the ratchet mechanism 300 may be dependent upon the precision of the ratchet mechanism 300 and, namely, the manufacturing precision of the ratchet faces 364 of the ratchet rings 350. Because the ratchet mechanism utilizes similar or substantially identical ratchet rings 350, manufacturing complexity and cost may be reduced. In other implementations, rings 350-1 and 350-2 may be different from one another, yet provide one or more of the above-described features or having one or more of the above-described characteristics.

Figure 11:
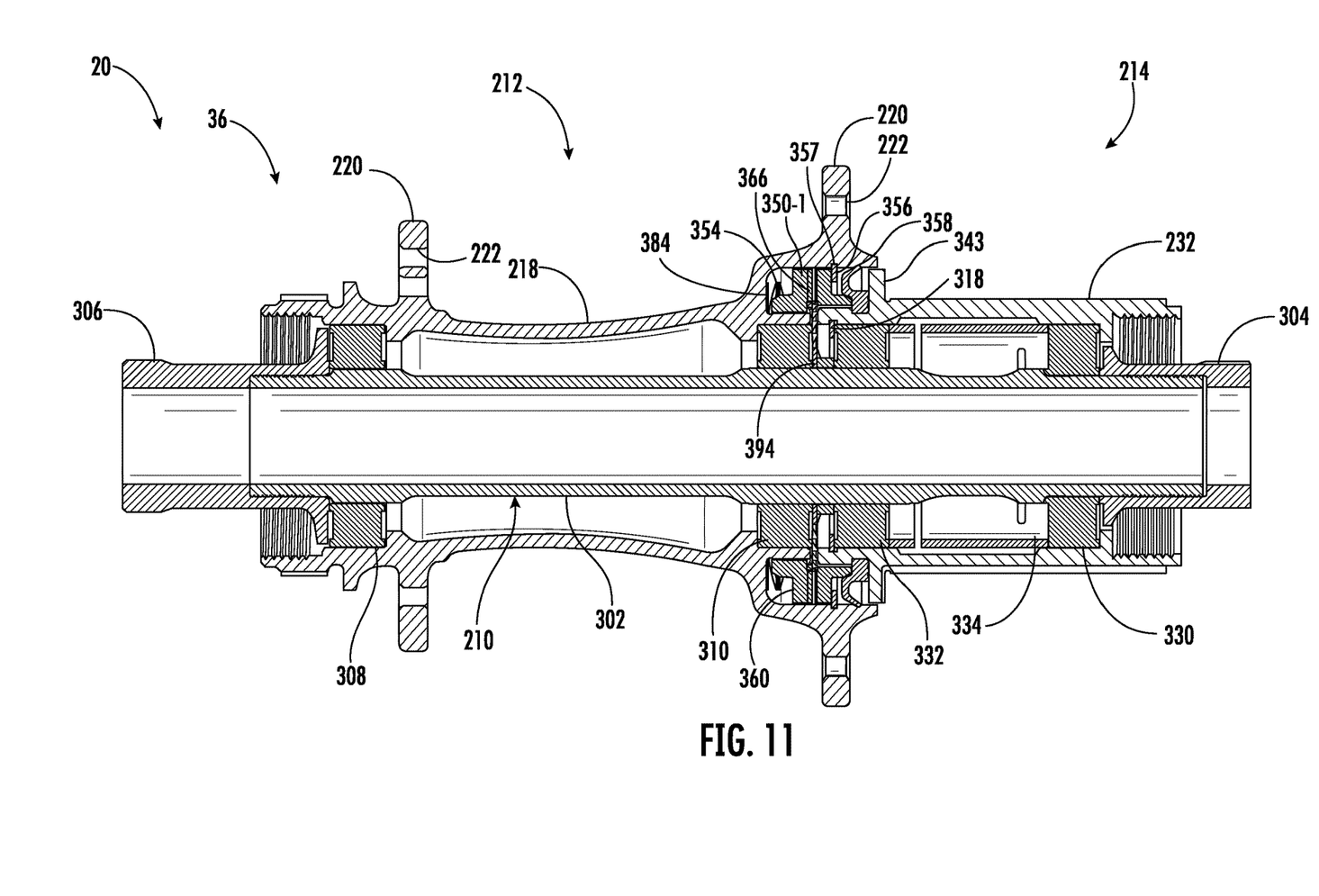
FIG. 11 is a sectional view of the example drive assembly of FIG. 3.

As shown by FIGS. 6 and 11, spring 354 is captured between an internal shoulder 384 of hub shell 218 and the backside 360 of ratchet ring 350-1. Spring 354 overlaps and encircles bearing 310. In the example illustrated, spring 354 is in the form of a steel multiturn wave compression spring which encircles leg 378 and which abuts leg 380 of ratchet ring 350-1. Spring 354 resiliently biases ratchet ring 350-1 towards and against ratchet ring 350-2. During rotation of ratchet ring 350-1 relative to ratchet ring 350-2, such as when wheel 26 is coasting without receiving torque from free hub 214, ratchet ring 350-1 may be urged against spring 354, compressing spring 354 towards hub shell 218 to a greater extent. Although spring 354 is illustrated as a steel multi-turn wave compression spring, in other implementations, spring 354 may be formed from other materials and/or may have other configurations or types. For example, spring 354 may alternatively comprise a compression coil spring.

Retainer 356 comprise a mechanism configured to retain ratchet ring 350-2 against or in a connected state to ratchet ring 350-1 during and after separation of free hub 214 from hub 212. In some circumstances, maintenance of drive assembly 36 may involve disconnection and separation of at least portions of free hub 214 from hub 212. Without retainer 356, ratchet ring 350-2 might otherwise separate from ratchet ring 350-1 and fall to the ground, becoming contaminated. Retainer 356 reduces the likelihood of such contamination, facilitating easier maintenance of drive assembly 36.

Figure 12:
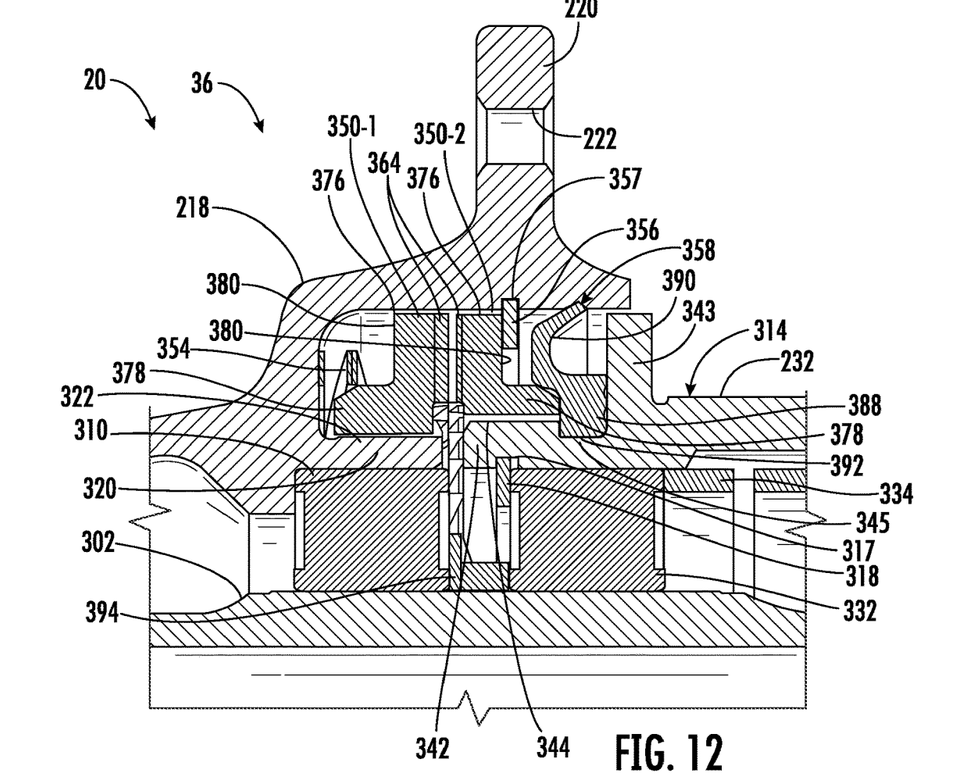
FIG. 12 is an enlarged view of a portion of the sectional view shown in FIG. 11.

As shown by FIG. 7, in the example illustrated, retainer 356 comprises a C-clip or ring. FIG. 12 is an enlarged view of portions of the sectional view of those portions of drive assembly 36 shown in FIG. 11. As shown by FIG. 12, retainer 356 is retained within an internal groove 357 (also shown in FIG. 5) of hub shell 218. The diameter and location of groove 357 and the radial width of retainer 356 are such that retainer 356 projects beyond groove 357 into abutment with leg 376 on the backside 366 of ratchet ring 350-2. Although illustrated as a C-shaped snap ring or clip, retainer 356 may have other configurations facilitating an axial retention of ratchet ring to within hub shell 218 and against ratchet ring 350-1 during and after separation of free hub 214 from hub 212.

As shown by FIG. 7, dampener 358 comprises an annular ring and is formed from an elastic and/or compressible material, such as a rubber a rubber-like material. As shown by FIG. 12, dampener 358 comprises a dampening portion 388 and the sealing portion 390.

Dampening portion 388 comprises that portion of dampener 358 that is axially captured between an axial edge or end of ratchet ring 350-2 and an axial face of free hub shell 232. In the example illustrated, dampening portion 388 directly abuts an axial end or edge of leg 378 of ratchet ring 350-2 and directly abuts an axial face of collar 343 of free hub shell 232. In some implementations, additional components or structures may be sandwiched between dampening portion 388 and axial end portions of free hub shell 232 and/or the axial end portions of ratchet ring 350-2. Dampening portion 388 is captured within an outer circumferential groove 345 formed in shell 232 between the exterior surface 342 and collar 343. In the example illustrated, dampening portion 388 encircles bearing 332 while being supported outside of and out of contact with bearing 332 by free hub shell 232. Dampening portion 388 absorbs vibration and size or dampens vibration by serving as an axial bumper or shock absorber between ratchet ring 350-2 and free hub shell 232.

Sealing portion 390 outwardly extends from dampening portion 388 along the backside 366 of ratchet ring 350-2. Sealing portion 390 forms a flap that resiliently extends into abutment with an interior surface of hub shell 218. As a result, dampener 358 continuously extends from an outer surface of free hub shell 232 and to an inner surface of hub shell 218, forming a seal therebetween. Sealing portion 390 is sufficiently flexible such that dampener 358 may be withdrawn from within the interior of hub shell 218 during the withdrawal of free hub shell 232 from the interior of hub shell 218. As discussed above, during such withdrawal during which the axially extending splines of surface 342 are being axially slid relative to the internal splined of ratchet ring 350-2, retainer 356 secures ratchet ring 350-2 in place against ratchet ring 350-1. In other implementations, the dampening and sealing functions provided by dampener may alternatively be formed by separate compressible and/or elastomeric components.

As further shown by FIG. 12, the overall construction of drive assembly 36 results in several components radially overlapping one another. This is in part achieved by the nesting of free hub shell 232 within hub shell 218. In the example illustrated, although free of shell 232 is partially nestled within hub shell 218, bearing 310 does not support (is not inset within) any portion of free hub shell 232. Likewise, bearing 332 does not support (is not inset within) any portion of hub shell 218.

Ratchet ring 350-1 radially overlaps and extends about or around bearing 310. Ratchet ring 350-2 radially overlaps and extends about around bearing 332. Spring 354 radially overlaps and extends about or around bearing 310. Dampener 358 radially overlaps and extends about around bearing 332. The flange 220 and the associated spoke openings 222 radially overlap and extend about or around portions of bearing 332, the bearing supporting free hub shell 232. Because such components radially overlap one another, the bearings 310, 332 supporting the axial end portions of hub shell 218 and free hub shell 232, respectively, may be axially positioned closer to one another. As a result, the bearings 310, 332 are positioned closer to the axial end portions or axial ends of hub shell 218 and free hub shell 232, respectively. Because the bearings 310, 332 of the hub shell and the free hub may be more closely positioned to one another along the axle 210, deflection of the axle shaft 302 may be reduced. This deflection reduction may result in better stiffness, bearing wear and power transfer. This deflection reduction may also result in less wear of the axle shaft 302 and bearings 308, 310, 330, 332, increasing durability and prolonging life of the drive assembly 36.

As further shown by FIG. 12, the nesting of free hub shell 232 within hub shell 218 also facilitates the radial alignment of the surfaces 322 and 340 as well as the radial alignment of their splines in the particular examples. The nesting of the free hub shell 232 within hub shell 218 further facilitates the radial alignment of bearings 310 and 330. Said another way, the free hub shell 232 and hub shell 218 are configured such that axial end portions of free hub shell 232 are positioned partially within hub shell 218, the outer surface of the splines of surfaces 322 and 340 are radially spaced by the same distance from the rotational axis or centerline of axle shaft 302. Likewise, the inner races and/or the outer races of bearings 310 and 332 are each radially spaced by the same radial distance from the rotational axis and line of axle shaft 302.

Figure 13:
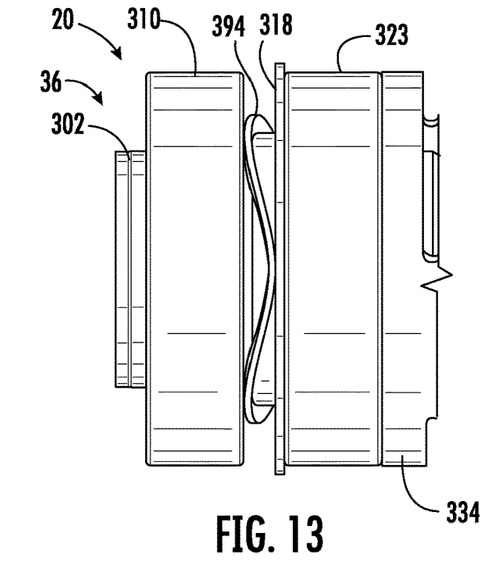
FIG. 13 is an enlarged side view of a portion of the drive assembly of FIG. 3 with the example hub shell, the example free hub shell and the example ratchet mechanism being removed.
Figure 14:
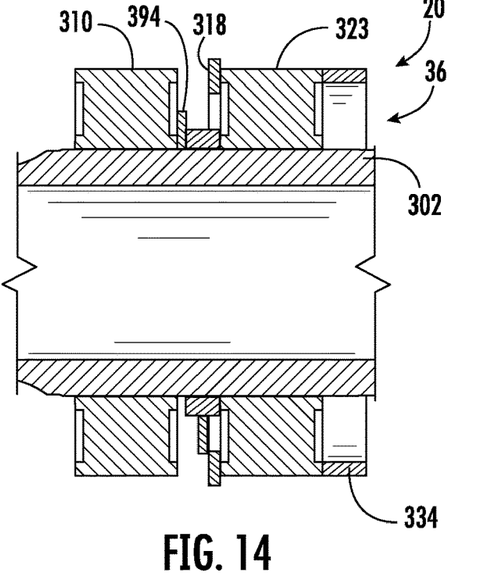
FIG. 14 is a sectional view of the portion of the drive assembly shown in FIG. 13.

As shown by FIGS. 13 and 14, drive assembly 36 additionally comprises a spring 394 captured between bearing 310 and bearing 332 to resiliently urge the bearing 310 and the bearing 332 away from one another. The spring 394 may reduce wear of such bearings over time and increase the durability of the drive assembly. In the example illustrated, spring 394 encircles axle shaft 302. In the example illustrated, spring 394 comprises a wave washer captured between the races of bearings 310 and 332. In other implementations, spring 394 may comprise other types of springs, such as a coil compression spring, leaf spring, or the like.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A bicycle drive assembly comprising:
   an axle extending along an axis;
   a hub shell rotatably mounted on the axle by a first bearing;
   a free hub rotatably mounted on the axle by a second bearing; and
   a ratchet mechanism releasably coupling the free hub to the hub shell to transmit torque from the free hub to the hub, the ratchet mechanism comprising:
   a first ratchet ring joined to the hub shell for rotation with the hub shell, the first ratchet ring encircling and radially overlapping the first bearing, the first ratchet ring having a first axial ratchet face and an inner radial face interlocked to the hub shell to transmit torque between the first ratchet ring and the hub shell, wherein the axial face has a radial length RL and wherein the radial face has an axial length of at least 0.75 RL, wherein the first ratchet ring cross section has an L-shape;
   a second ratchet ring joined to the free hub for rotation with the free hub, the second ratchet ring having a second ratchet face, the second ratchet ring encircling and radially overlapping the second bearing; and
   at least one spring resiliently biasing the first ratchet face and the second ratchet face into engagement to transmit torque from the free hub to the hub shell,
   wherein the first ratchet ring has a first leg of at least 3 mm and a second leg extending perpendicular to the first leg, the second leg having a length of at least 3 mm.

2. The bicycle drive assembly of claim 1, wherein the first leg has a ratchet toothed surface forming the first ratchet face and wherein the second leg has a splined surface and extends from the first leg in a direction towards the hub shell, the splined surface interlocking with the hub shell.

3. The bicycle drive assembly of claim 2, wherein the second ratchet ring has a first leg of at least 3 mm and a second leg extending perpendicular to the first leg, the second leg having a length of at least 3 mm.

4. The bicycle drive assembly of claim 3, wherein the first leg of the second ratchet ring has a ratchet toothed surface and wherein the second leg of the second ratchet ring has a splined surface interlocking with the free hub, the second leg extending from the first leg in a direction towards the free hub.

5. The bicycle drive assembly of claim 1 further comprising an elastomeric damper axially captured between and engaging the second ratchet ring and the free hub.

6. The bicycle drive assembly of claim 5, wherein the elastomeric dampener seals against a portion of the free hub.

7. The bicycle drive assembly of claim 5 further comprising a retainer secured to the hub shell and in engagement with the second ratchet ring to retain the second ratchet ring against the first ratchet ring upon separation of the free hub from the hub shell.

8. The bicycle drive assembly of claim 7, wherein the retainer comprises a C-clip partially received within an internal groove in the hub shell and projecting into engagement with an axial face of the second ratchet ring.

9. The bicycle drive assembly of claim 1 further comprising a retainer secured to the hub shell and in engagement with the second ratchet ring to retain the second ratchet ring against the first ratchet ring upon separation of the free hub from the hub shell.

10. The bicycle drive assembly of claim 9, wherein the retainer comprises a C-clip partially received within an internal groove in the hub shell and projecting into engagement with an axial face of the second ratchet ring.

11. A bicycle drive assembly comprising:
an axle extending along an axis;
a hub shell rotatably mounted on the axle by a first bearing;
a free hub rotatably mounted on the axle by a second bearing; and
a ratchet mechanism releasably coupling the free hub to the hub shell to transmit torque from the free hub to the hub shell, the ratchet mechanism comprising:
  a first ratchet ring joined to the hub shell for rotation with the hub shell, the first ratchet ring encircling and radially overlapping the first bearing, the first ratchet ring having a first ratchet face;
  a second ratchet ring joined to the free hub for rotation with the free hub, the second ratchet ring encircling and radially overlapping the second bearing, the second ratchet ring having a second ratchet face;
  at least one spring resiliently biasing the first ratchet face and the second ratchet face into engagement to transmit torque from the free hub to the hub shell; and
  an elastomeric damper axially captured between and engaging the second ratchet ring and the free hub.

12. The bicycle drive assembly of claim 11, wherein the elastomeric dampener seals against a portion of the hub shell.

13. The bicycle drive assembly of claim 11 further comprising a retainer secured to the hub shell and in engagement with the second ratchet ring to retain the second ratchet ring against the first ratchet ring upon separation of the free hub from the hub shell.

14. A bicycle drive assembly comprising:
an axle extending along an axis;
a hub shell rotatably mounted on the axle by a first bearing;
a free hub rotatably mounted on the axle by a second bearing; and
a ratchet mechanism releasably coupling the free hub to the hub shell to transmit torque from the free hub to the hub, the ratchet mechanism comprising:
  a first ratchet ring joined to the hub shell for rotation with the hub shell, the first ratchet ring encircling and radially overlapping the first bearing, the first ratchet ring having a first ratchet face;
  a second ratchet ring joined to the free hub for rotation with the free hub, the second ratchet ring encircling and radially overlapping the second bearing;
  at least one spring resiliently biasing the first ratchet face and the second ratchet face into engagement to transmit torque from the free hub to the hub shell; and
  a retainer secured to the hub shell and in engagement with the second ratchet ring to retain the second ratchet ring against the first ratchet ring upon separation of the free hub from the hub shell, wherein the retainer comprises a C-clip partially received within an internal groove in the hub shell and projecting into engagement with an axial face of the second ratchet ring.

\* \* \* \* \*